March 14, 1933.  R. ERREN  1,901,709
METHOD FOR DRIVING INTERNAL COMBUSTION ENGINES
Filed March 15, 1930   2 Sheets-Sheet 1

INVENTOR
RUDOLF ERREN
BY
Richards & Geier
ATTORNEYS

March 14, 1933.    R. ERREN    1,901,709
METHOD FOR DRIVING INTERNAL COMBUSTION ENGINES
Filed March 15, 1930    2 Sheets-Sheet 2
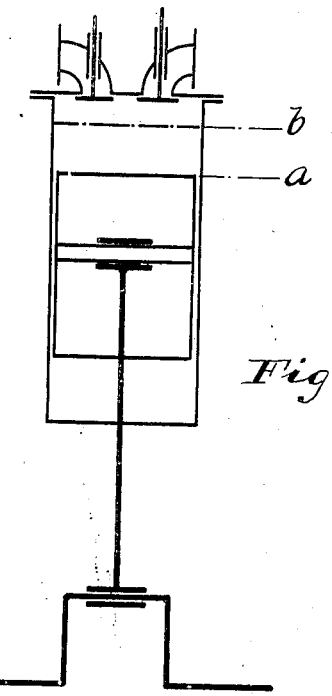
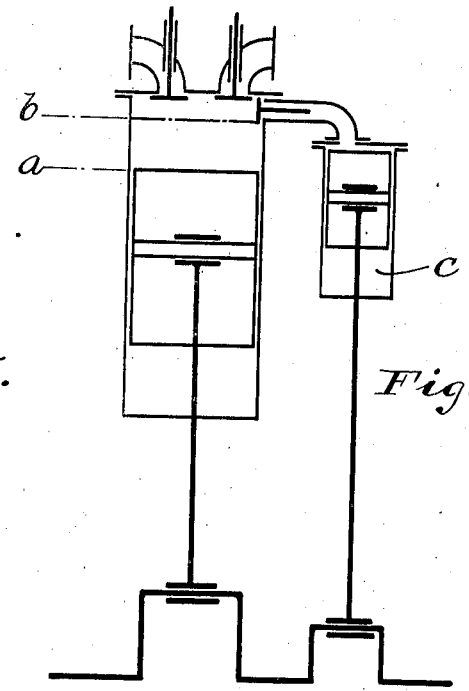
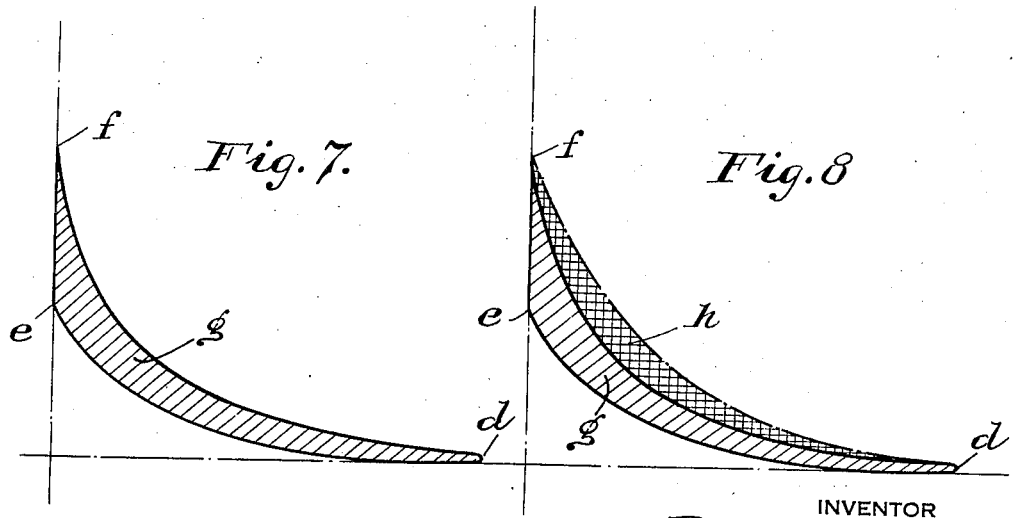
INVENTOR
RUDOLF ERREN
BY
Richards & Geier
ATTORNEYS Patented Mar. 14, 1933

1,901,709

UNITED STATES PATENT OFFICE

RUDOLF ERREN, OF BERLIN, GERMANY

METHOD FOR DRIVING INTERNAL COMBUSTION ENGINES

Application filed March 15, 1930, Serial No. 436,252, and in Germany June 1, 1929.

This invention relates to an improvement of my invention claimed and described in my patent application Serial No. 436,073 filed March 15th, 1930, and which relates to an internal combustion engine particularly by a two-stroke engine adapted for the employment of oxyhydrogen gas, or explosive gas as it is called, as a driving fuel for the engine and a method for driving the same.

The invention particularly relates to certain measures for the prevention of accidents which may be caused by explosion or by excessive heat.

For the said purpose the essential feature of the invention consists in that in the beginning of the admission stroke both the admission and exhaust valves are closed and remain closed until the piston has passed through approximately 10% of its downward stroke. Thereby a rarification of the air and a consequent cooling action has taken place within the cylinder. In the said position of the piston the admission valve opens up and admits the mixture during a portion of about 20% of the piston way, whereupon it closes down again. It is evident, that the mixture which is now enclosed in the cylinder stands under a considerable subatmospheric pressure, which is still further enhanced by a further displacement of the piston by another 10% of the piston stroke. At this moment ignition is caused to take place, so that the exploding gas hits upon the piston while the latter is rapidly travelling downwards. In this way any adverse effect of the explosion on the piston movement is prevented. A short distance, approximately 5 to 10% of the piston stroke, before the piston reaches its lower dead centre, the exhaust valve opens and the burnt gases are free to escape. On its return stroke the piston then scavenges the cylinder of any exhaust products which may still be present.

In the drawings showing preferred embodiments of the inventive idea:

Figure 5 shows diagrammatically a safe position of the piston at the upper dead centre.

Figure 6 is a modification of Figure 5.

Figure 7 is a diagram of work of an ordinary two-stroke engine having no heat transmission means.

Figure 8 is a diagram of work of an engine provided with heat transmitting means.

Figure 4:
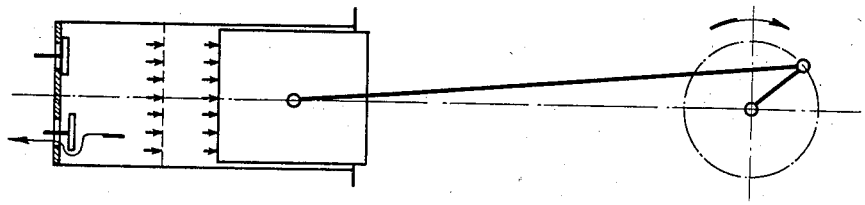
Figure 4 shows the piston at the end of the downward stroke.
Figure 3:
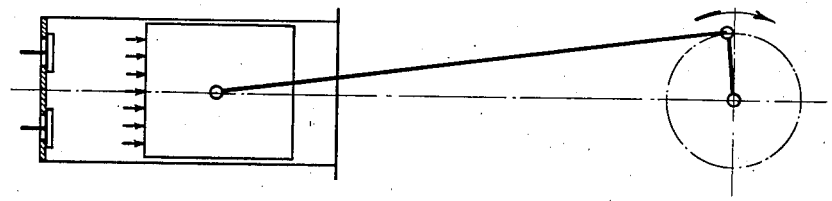
Figure 3 shows the position of the piston during ignition.
Figure 2:
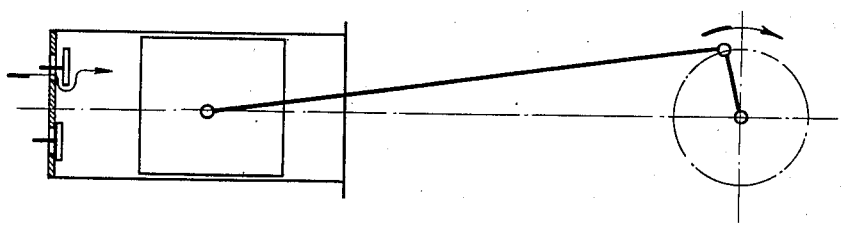
Figure 2 shows the position of the piston during a further part of the downward stroke when the admission valve is opened.
Figure 1:
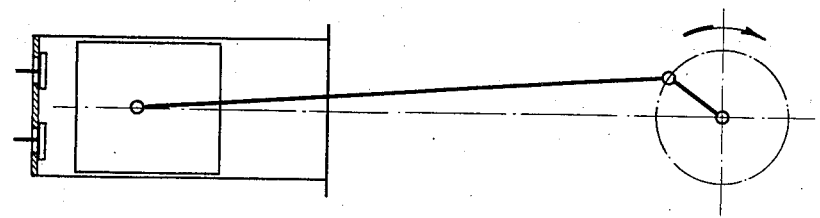
Figure 1 shows diagrammatically the position of the piston within the cylinder at the beginning of the downward stroke.

In the position shown in Figure 1 of the drawings, the piston is at the beginning of its admission stroke, both the valves being closed during 10% of the piston way, so that air is rarified within the cylinder. Then the admission valve is opened (Figure 2) and it remains open during about a further 20% of the piston way. The admission valve is then closed, the piston travels another 10% of its way and then the ignition takes place (Figure 3). As shown in Figure 4, the exhaust valve is opened at the end of the expansion, so that the gases are lead out during the upward movement of the piston.

In engines working with oxhydrogen gas it is possible to allow a certain amount of compression but the pressure in the combustion chamber must in that case always remain lower than a certain amount which corresponds to the self-ignition temperature of the oxyhydrogen gas mixture. For that purpose, I prefer to leave such a large clearing space above the upper dead centre position of the piston that the compression pressure will remain within a safe margin below the above-mentioned highest pressure, i. e. under 35 atmospheres. The compression may be created either by the machine itself or by a special comp.essor. In Figures 5 and 6 the position of the piston at which a self-ignition of the charge would take place is shown by the broken line $b$, whereas the highest actual position which the piston can assume is shown by the line *a*.

In the modification shown in Figure 6 the gas mixture is introduced into the combustion chamber by means of a compressor or a pump *c*, so that the motor may be used as a two-stroke engine.

Another feature of the invention consists in that oxyhydrogen gas engines of the type described may be driven with superchargers.

In oxyhydrogen engines, before the ignition takes place it is usually not possible to properly transmit the created heat energies, as there is no suitable medium for this purpose. According to this invention, however, the missing medium is introduced into the cylinder from without, this medium being either atmospheric air or any other agent, such as water, steam, or the like.

Figure 7 shows a diagram of work of an ordinary two-stroke internal combustion engine which is not provided with a heat transmitting medium. In this figure the line *d—e* represents compression, the line *e—f* is the ignition and the line *f—d* is the exhaust. The total diagram area is designated by the letter *g*. Figure 8 shows a diagram of work of a similar engine provided with the heat transmitting medium. It will be noticed that the area of the diagram in Figure 8 is larger than the area of the diagram shown in Figure 7, the additional area being shown by the surface *h* in Figure 8. This additional area *h* represents an increase in power due to the use of a heat transmitting medium which does not take part in the combustion but is heated and expanded. The area *h* represents a uniform increase of the usual diagram area, so that the uniform action of the forces driving the piston of a combustion engine is maintained.

What I claim is:—

1. A method of driving two-stroke internal combustion engines on oxyhydrogen gas, comprising the steps of keeping the valves closed during 10% of the admission stroke so as to create a rarefaction of air in the cylinder, then opening the admission valve and keeping said valve open during further 20% of the stroke, closing said valve and letting the piston move further 10% of the stroke until ignition takes place, and opening the exhaust valve near the end of said stroke.

2. A method of driving two-stroke internal combustion engines on oxyhydrogen gas, according to claim 1, wherein the compression of the oxyhydrogen gas mixture is performed by a separate device, the corresponding pressure being lower than the ignition pressure of the oxyhydrogen gas charge.

3. A method of driving two-stroke internal combustion engines on oxyhydrogen gas, according to claim 1, wherein a medium is introduced into the combustion chamber before the explosion takes place, said medium compensating the fall in pressure during the combustion of the pure oxyhydrogen gas.

In witness whereof I affix my signature.

RUDOLF ERREN.